United States Patent
Petriuc

(10) Patent No.: US 7,827,181 B2
(45) Date of Patent: Nov. 2, 2010

(54) CLICK DISTANCE DETERMINATION

(75) Inventor: Mihai Petriuc, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 173 days.

(21) Appl. No.: 11/238,906

(22) Filed: Sep. 29, 2005

(65) Prior Publication Data

US 2006/0069982 A1    Mar. 30, 2006

Related U.S. Application Data

(63) Continuation-in-part of application No. 10/955,983, filed on Sep. 30, 2004, now Pat. No. 7,761,448.

(51) Int. Cl.
*G06F 17/00* (2006.01)
(52) U.S. Cl. ............... 707/742; 707/711; 707/749
(58) Field of Classification Search ........... 707/711, 707/742, 749
See application file for complete search history.

(56) References Cited

U.S. PATENT DOCUMENTS

| | | | |
|---|---|---|---|
| 5,222,236 A | 6/1993 | Potash et al. | 707/102 |
| 5,527,577 A | 11/1993 | Clark | 100/99 |
| 5,594,660 A | 1/1997 | Sung et al. | 715/500.1 |
| 5,606,609 A | 2/1997 | Houser et al. | 713/179 |
| 5,848,404 A | 12/1998 | Hafner et al. | 707/3 |
| 5,893,092 A | 4/1999 | Driscoll | 707/5 |
| 5,920,859 A * | 7/1999 | Li | 707/5 |
| 5,933,851 A | 8/1999 | Kojima et al. | 711/133 |
| 5,960,383 A | 9/1999 | Fleischer | 704/9 |
| 5,983,216 A | 11/1999 | Kirsch et al. | 707/9 |
| 5,987,457 A | 11/1999 | Ballard | 707/5 |
| 6,006,225 A | 12/1999 | Bowman et al. | 707/5 |
| 6,012,053 A | 1/2000 | Pant et al. | 707/3 |
| 6,032,196 A | 2/2000 | Monier | 709/245 |
| 6,041,323 A | 3/2000 | Kubota | 707/5 |
| 6,070,158 A | 5/2000 | Kirsch et al. | 707/3 |
| 6,070,191 A | 5/2000 | Narendran et al. | 709/226 |

(Continued)

FOREIGN PATENT DOCUMENTS

DE    10029644 A1    1/2002

(Continued)

OTHER PUBLICATIONS

Ronald Fagin et al, "Searching the Workplace Web", IBM Almaden Research Center, ACM, May 2003, pp. 366-375.*

(Continued)

*Primary Examiner*—Apu M Mofiz
*Assistant Examiner*—Hung D Le
(74) *Attorney, Agent, or Firm*—Merchant & Gould, P.C.

(57) ABSTRACT

An efficient determination of a click distance value is made for each document in a corpus of documents from data included in a locally-stored inverted index. The click distance is measurement of the number clicks or user navigations from a first document on the network to another document. Specialized words are included in the locally-stored inverted index. The specialized words relate source documents to a set of target documents. A click distance is assigned to a source document when an inverted index is queried for the corresponding set of target documents according to a query that passes in one of the specialized words. The process is repeated for each document in the corpus of documents.

20 Claims, 7 Drawing Sheets

U.S. PATENT DOCUMENTS

| | | | |
|---|---|---|---|
| 6,098,064 A | 8/2000 | Pirolli et al. | 707/2 |
| 6,125,361 A | 9/2000 | Chakrabarti et al. | 707/3 |
| 6,128,701 A | 10/2000 | Malcolm et al. | 711/133 |
| 6,145,003 A | 11/2000 | Sanu et al. | 709/225 |
| 6,151,624 A | 11/2000 | Teare et al. | 709/217 |
| 6,167,369 A | 12/2000 | Schulze | 704/9 |
| 6,182,085 B1 | 1/2001 | Eichstaedt et al. | 707/104.1 |
| 6,182,113 B1 | 1/2001 | Narayanaswami | 709/203 |
| 6,185,558 B1 | 2/2001 | Bowman et al. | 707/5 |
| 6,202,058 B1 | 3/2001 | Rose et al. | 706/45 |
| 6,208,988 B1 | 3/2001 | Schultz | 707/5 |
| 6,216,123 B1 | 4/2001 | Robertson et al. | 707/3 |
| 6,222,559 B1 | 4/2001 | Asano et al. | 345/440 |
| 6,240,407 B1 | 5/2001 | Chang et al. | 707/2 |
| 6,240,408 B1 | 5/2001 | Kaufman | 707/3 |
| 6,247,013 B1 | 6/2001 | Morimoto | 707/10 |
| 6,263,364 B1 | 7/2001 | Najork et al. | 709/217 |
| 6,285,367 B1 | 9/2001 | Abrams et al. | 345/357 |
| 6,285,999 B1 | 9/2001 | Page | 707/5 |
| 6,304,864 B1 | 10/2001 | Liddy et al. | 706/15 |
| 6,317,741 B1 | 11/2001 | Burrows | 707/5 |
| 6,327,590 B1 | 12/2001 | Chidlovskii | 707/5 |
| 6,349,308 B1 | 2/2002 | Whang et al. | 707/107 |
| 6,351,467 B1 | 2/2002 | Dillon | 370/432 |
| 6,351,755 B1 | 2/2002 | Najork et al. | 707/501.1 |
| 6,360,215 B1 | 3/2002 | Judd et al. | 707/3 |
| 6,385,602 B1 | 5/2002 | Tso et al. | 707/3 |
| 6,389,436 B1 | 5/2002 | Chakrabarti et al. | 715/513 |
| 6,418,433 B1 | 7/2002 | Chakrabarti et al. | 707/5 |
| 6,418,452 B1 | 7/2002 | Kraft et al. | 707/200 |
| 6,418,453 B1 | 7/2002 | Kraft et al. | 707/200 |
| 6,442,606 B1 | 8/2002 | Subbaroyan et al. | 709/224 |
| 6,473,752 B1 | 10/2002 | Fleming | 707/4 |
| 6,484,204 B1 | 11/2002 | Rabinovich | 709/226 |
| 6,516,312 B1 | 2/2003 | Kraft et al. | 707/3 |
| 6,539,376 B1 | 3/2003 | Sundaresan et al. | 707/5 |
| 6,546,388 B1 | 4/2003 | Edlund et al. | 707/5 |
| 6,547,829 B1 | 4/2003 | Meyerzon et al. | 715/501.1 |
| 6,549,896 B1 | 4/2003 | Candan et al. | 707/2 |
| 6,549,897 B1 | 4/2003 | Katariya et al. | 707/5 |
| 6,553,364 B1 * | 4/2003 | Wu | 1/1 |
| 6,594,682 B2 | 7/2003 | Peterson et al. | 718/102 |
| 6,598,047 B1 | 7/2003 | Russell et al. | 707/5 |
| 6,598,051 B1 | 7/2003 | Wiener et al. | 7/100 |
| 6,601,075 B1 | 7/2003 | Huang et al. | 707/104.1 |
| 6,622,140 B1 | 9/2003 | Kantrowitz | 707/5 |
| 6,628,304 B2 | 9/2003 | Mitchell et al. | 345/734 |
| 6,633,867 B1 | 10/2003 | Kraft et al. | 707/3 |
| 6,633,868 B1 | 10/2003 | Min | 707/3 |
| 6,636,853 B1 | 10/2003 | Stephens | 707/10 |
| 6,638,314 B1 | 10/2003 | Meyerzon et al. | 715/234 |
| 6,671,683 B2 | 12/2003 | Kanno | 707/5 |
| 6,701,318 B2 | 3/2004 | Fox et al. | 707/10 |
| 6,718,324 B2 | 4/2004 | Edlund et al. | 707/5 |
| 6,718,365 B1 | 4/2004 | Dutta | 709/203 |
| 6,738,764 B2 | 5/2004 | Mao et al. | 707/5 |
| 6,763,362 B2 | 7/2004 | McKeeth | 707/104.1 |
| 6,766,316 B2 | 7/2004 | Caudill et al. | 707/3 |
| 6,766,422 B2 | 7/2004 | Beyda | 711/137 |
| 6,775,659 B2 | 8/2004 | Clifton-Bligh | 707/1 |
| 6,775,664 B2 | 8/2004 | Lang et al. | 707/3 |
| 6,778,997 B2 | 8/2004 | Sundaresan et al. | 707/104.1 |
| 6,829,606 B2 | 12/2004 | Ripley | 707/5 |
| 6,859,800 B1 | 2/2005 | Roche et al. | 707/3 |
| 6,862,710 B1 | 3/2005 | Marchisio | 715/501.1 |
| 6,868,411 B2 | 3/2005 | Shanahan | 706/52 |
| 6,871,202 B2 | 3/2005 | Broder | 707/7 |
| 6,883,135 B1 | 4/2005 | Obata et al. | 715/202 |
| 6,886,010 B2 | 4/2005 | Kostoff | 707/3 |
| 6,886,129 B1 | 4/2005 | Raghavan et al. | 715/501.1 |
| 6,910,029 B1 | 6/2005 | Sundaresan | 707/2 |
| 6,931,397 B1 | 8/2005 | Sundaresan | 707/5 |
| 6,934,714 B2 | 8/2005 | Meinig | 707/102 |
| 6,944,609 B2 | 9/2005 | Witbrock | 707/3 |
| 6,947,930 B2 | 9/2005 | Anick et al. | 707/5 |
| 6,959,326 B1 | 10/2005 | Day et al. | 709/217 |
| 6,973,490 B1 | 12/2005 | Robertson et al. | 709/224 |
| 6,990,628 B1 | 1/2006 | Palmer et al. | 707/501 |
| 7,016,540 B1 * | 3/2006 | Gong et al. | 382/225 |
| 7,028,029 B2 | 4/2006 | Kamvar et al. | 707/5 |
| 7,039,234 B2 | 5/2006 | Geidl et al. | 382/187 |
| 7,051,023 B2 | 5/2006 | Kapur et al. | 707/5 |
| 7,072,888 B1 | 7/2006 | Perkins | 707/10 |
| 7,076,483 B2 | 7/2006 | Preda et al. | 707/5 |
| 7,080,073 B1 * | 7/2006 | Jiang et al. | 707/7 |
| 7,107,218 B1 | 9/2006 | Preston | 704/270 |
| 7,152,059 B2 | 12/2006 | Monteverde | 707/3 |
| 7,181,438 B1 * | 2/2007 | Szabo | 707/2 |
| 7,197,497 B2 | 3/2007 | Cossock | 707/7 |
| 7,231,399 B1 | 6/2007 | Bem et al. | 707/102 |
| 7,243,102 B1 | 7/2007 | Naam et al. | 707/7 |
| 7,246,128 B2 | 7/2007 | Jordahl | 707/100 |
| 7,257,574 B2 | 8/2007 | Parikh | 707/3 |
| 7,257,577 B2 | 8/2007 | Fagin et al. | 707/7 |
| 7,260,573 B1 * | 8/2007 | Jeh et al. | 707/7 |
| 7,281,002 B2 | 10/2007 | Farrell | 707/3 |
| 7,308,643 B1 * | 12/2007 | Zhu et al. | 715/206 |
| 7,328,401 B2 | 2/2008 | Obata et al. | 707/3 |
| 7,346,604 B1 * | 3/2008 | Bharat et al. | 707/3 |
| 7,346,839 B2 | 3/2008 | Acharya et al. | 1/1 |
| 7,386,527 B2 | 6/2008 | Harris et al. | 706/59 |
| 7,428,530 B2 | 9/2008 | Ramarathnam et al. | 707/3 |
| 7,496,561 B2 | 2/2009 | Caudill et al. | 1/1 |
| 7,519,529 B1 | 4/2009 | Horvitz | 704/7 |
| 7,685,084 B2 | 3/2010 | Sisk et al. | 706/45 |
| 7,689,531 B1 | 3/2010 | Diao et al. | 706/62 |
| 7,716,225 B1 | 5/2010 | Dean et al. | 707/748 |
| 2001/0042076 A1 | 11/2001 | Fukuda | 707/500 |
| 2002/0055940 A1 | 5/2002 | Elkan | 707/104.1 |
| 2002/0062323 A1 | 5/2002 | Takatori et al. | 707/514 |
| 2002/0078045 A1 | 6/2002 | Dutta | 707/7 |
| 2002/0099694 A1 | 7/2002 | Diamond et al. | 707/3 |
| 2002/0103798 A1 | 8/2002 | Abrol et al. | 707/5 |
| 2002/0107861 A1 | 8/2002 | Clendinning et al. | 707/101 |
| 2002/0107886 A1 | 8/2002 | Gentner et al. | 707/511 |
| 2002/0129014 A1 | 9/2002 | Kim et al. | 707/5 |
| 2002/0169595 A1 | 11/2002 | Agichtein et al. | 704/9 |
| 2002/0169770 A1 | 11/2002 | Kim et al. | 707/5 |
| 2003/0037074 A1 | 2/2003 | Dwork et al. | 707/500 |
| 2003/0053084 A1 | 3/2003 | Geidl et al. | 358/1.5 |
| 2003/0055810 A1 | 3/2003 | Cragun et al. | 707/1 |
| 2003/0061201 A1 | 3/2003 | Grefenstette et al. | 707/3 |
| 2003/0065706 A1 | 4/2003 | Smyth et al. | 709/200 |
| 2003/0074368 A1 | 4/2003 | Schuetze et al. | 707/103 R |
| 2003/0088545 A1 * | 5/2003 | Subramaniam et al. | 707/3 |
| 2003/0208482 A1 | 11/2003 | Kim et al. | 707/3 |
| 2003/0217007 A1 | 11/2003 | Fukushima et al. | 705/51 |
| 2003/0217047 A1 | 11/2003 | Marchisio | 707/3 |
| 2003/0217052 A1 | 11/2003 | Rubenczyk et al. | 707/3 |
| 2004/0003028 A1 | 1/2004 | Emmett et al. | 709/203 |
| 2004/0006559 A1 | 1/2004 | Gange et al. | 707/3 |
| 2004/0049766 A1 | 3/2004 | Bloch et al. | 717/121 |
| 2004/0093328 A1 | 5/2004 | Damle | 707/3 |
| 2004/0111408 A1 | 6/2004 | Caudill et al. | 707/3 |
| 2004/0117351 A1 | 6/2004 | Challapalli et al. | 707/2 |
| 2004/0148278 A1 | 7/2004 | Milo et al. | 707/3 |
| 2004/0181515 A1 | 9/2004 | Ullmann et al. | 707/3 |
| 2004/0186827 A1 | 9/2004 | Anick et al. | 707/3 |
| 2004/0194099 A1 | 9/2004 | Lamping et al. | 718/100 |
| 2004/0199497 A1 | 10/2004 | Timmons | 707/3 |
| 2004/0205497 A1 * | 10/2004 | Alexander et al. | 715/501.1 |
| 2004/0215606 A1 | 10/2004 | Cossock | 707/3 |
| 2004/0215664 A1 | 10/2004 | Hennings et al. | 707/104.1 |
| 2004/0254932 A1 | 12/2004 | Gupta et al. | 707/7 |

| | | | | |
|---|---|---|---|---|
| 2005/0033742 A1 | 2/2005 | Kamvar et al. | | 707/7 |
| 2005/0044071 A1 | 2/2005 | Cho et al. | | 707/3 |
| 2005/0055340 A1 | 3/2005 | Dresden | | 707/3 |
| 2005/0055347 A9 | 3/2005 | Cho et al. | | 707/5 |
| 2005/0060186 A1 | 3/2005 | Blowers et al. | | 705/2 |
| 2005/0060304 A1 | 3/2005 | Parikh | | 707/3 |
| 2005/0060311 A1 | 3/2005 | Tong et al. | | 707/1 |
| 2005/0071328 A1 | 3/2005 | Lawrence | | 707/3 |
| 2005/0071741 A1 | 3/2005 | Acharya et al. | | 715/500 |
| 2005/0086192 A1 | 4/2005 | Kodama | | 707/1 |
| 2005/0086206 A1 | 4/2005 | Balasubramanian et al. | | 707/3 |
| 2005/0086583 A1 | 4/2005 | Obata et al. | | 715/229 |
| 2005/0089215 A1 | 4/2005 | Staelin et al. | | 382/157 |
| 2005/0144162 A1 | 6/2005 | Liang | | 707/3 |
| 2005/0154746 A1 | 7/2005 | Liu et al. | | 707/101 |
| 2005/0165781 A1 | 7/2005 | Kraft et al. | | 707/7 |
| 2005/0187965 A1 | 8/2005 | Abajian | | 707/102 |
| 2005/0192936 A1 | 9/2005 | Meek et al. | | 707/3 |
| 2005/0192955 A1 | 9/2005 | Farrell | | 707/5 |
| 2005/0210006 A1 | 9/2005 | Robertson | | 707/3 |
| 2005/0216533 A1 | 9/2005 | Berkhin | | 707/204 |
| 2005/0240580 A1 | 10/2005 | Zamir et al. | | 707/4 |
| 2005/0251499 A1 | 11/2005 | Huang | | 707/1 |
| 2005/0262050 A1* | 11/2005 | Fagin et al. | | 707/3 |
| 2005/0283473 A1 | 12/2005 | Rousso et al. | | 707/5 |
| 2006/0036598 A1 | 2/2006 | Wu | | 707/5 |
| 2006/0047649 A1 | 3/2006 | Liang | | 707/4 |
| 2006/0161534 A1 | 7/2006 | Carson et al. | | 707/3 |
| 2006/0173560 A1 | 8/2006 | Widrow | | 700/48 |
| 2006/0195440 A1 | 8/2006 | Burges et al. | | 707/5 |
| 2006/0206460 A1 | 9/2006 | Gadkari et al. | | 707/3 |
| 2006/0206476 A1 | 9/2006 | Kapur et al. | | 707/5 |
| 2006/0282306 A1 | 12/2006 | Thissen-Roe | | 705/11 |
| 2006/0282455 A1 | 12/2006 | Lee et al. | | 707/102 |
| 2006/0287993 A1 | 12/2006 | Yao et al. | | 707/4 |
| 2007/0038616 A1 | 2/2007 | Guha | | 707/4 |
| 2007/0038622 A1 | 2/2007 | Meyerzon et al. | | 705/5 |
| 2007/0073748 A1 | 3/2007 | Barney | | 707/101 |
| 2007/0106659 A1 | 5/2007 | Lu et al. | | 707/7 |
| 2007/0150473 A1 | 6/2007 | Li et al. | | 707/7 |
| 2007/0198459 A1 | 8/2007 | Boone et al. | | 707/1 |
| 2007/0276829 A1 | 11/2007 | Wang et al. | | 707/7 |
| 2008/0140641 A1 | 6/2008 | Wang | | 707/5 |
| 2008/0195596 A1 | 8/2008 | Sisk et al. | | 707/5 |
| 2009/0106221 A1 | 4/2009 | Meyerzon et al. | | 707/5 |
| 2009/0106223 A1 | 4/2009 | Meyerzon et al. | | 707/5 |
| 2009/0106235 A1 | 4/2009 | Tankovich et al. | | 707/5 |

FOREIGN PATENT DOCUMENTS

| | | |
|---|---|---|
| EP | 0950961 A2 | 10/1999 |
| EP | 0950961 A3 | 10/1999 |
| EP | 1 050 830 | 11/2000 |
| EP | 1120717 A2 | 8/2001 |
| JP | 10091638 | 4/1998 |
| JP | 11328191 | 11/1999 |
| JP | 2002-091843 | 3/2002 |
| JP | 2003-248696 | 9/2003 |
| KR | 10-2002-0015838 A | 3/2002 |
| KR | 10-2003-0082109 A | 10/2003 |
| KR | 10-2006-0116042 A | 11/2006 |

OTHER PUBLICATIONS

Cho et al, "Efficient Crawling Through URL Ordering", In Proceedings of the 7th International World Wide Web Conference, Apr. 1998, pp. 161-180.*
Hiemstra, D. et al., "Relevance Feedback for Best Match Term Weighting Algorithms in Information Retrieval", Proceedings of the Joint DELOS-NSF Workshop on Personalisation and Recommender Systems in Digital Libraries, ERCIM Workshop Proceedings 01/W03, pp. 37-42, Jun. 2001.
Brin, S. et al., "The Anatomy of a Large-Scale Hypertextual Web Search Engine", In Proceedings of the 7th International World Wide Web Conference, Brisbane, Australia, pp. 107-117, 1998.
Eiron, N. et al., "Analysis of Anchor Text for Web Search", Proceedings of the 26th Annual International ACM SIGIR Conference on Research and Development in Information Retrieval, Jul. 28-Aug. 1, 2003, Toronto, Canada, 8 pgs.
Manning, C. et al., "CS276A Text Information Retrieval, Mining, and Exploitation: Lecture 12", Stanford University CS276A/SYMBSYS2391/LING2391 Test Information Retrieval, Mining, and Exploitation, Fall 2002, last modified Nov. 18, 2002, 8 pgs.
Jones, K. et al., "A probabilistic model of information retrieval: development and status", Department of Information Science, City University, London, Aug. 1998, 74 pgs.
Numerico, T., "Search engines organization of information and Web Topology", http://www.cafm.lsbu.ac.uk/eminars/sse/numerico-6-dec-2004.pdf, Dec. 6, 2004, 32 pgs.
Zamir, O. et al., "Grouper: A Dynamic Clustering Interface to Web Search Results", Computer Networks (Amsterdam, Netherlands: 1999), 31(11-16): 1361-1374, 1999.
Losee, R. et al., "Research in Information Organization", Literature Review, School of Information and Library Science, Section 4, pp. 53-96, Jan. 2001.
Fagin, R. et al., "Searching the Workplace Web", IBM Almaden Research Center, In Proceedings of the Twelfth International World Wide Web Conference, Budapest, 2003, 21 pgs.
Carmel, D. et al., "Searching XML Documents Via XML Fragments", SIGIR Toronto, Canada, Jul.-Aug. 2003, pp. 151-158.
Craswell, N. et al., "TREC12 Web Track as CSIRO", TREC 12, Nov. 2003, 11 pp.
Cutler, M. et al., "A New Study on Using HTML Structures to Improve Retrieval", 11th IEEE International Conference on Chicago, IL, Nov. 9-11, 1999, pp. 406-409.
Hawking, D. et al., "Overview of the TREC-8 Web Track", TREC, Feb. 2000, pp. 1-18.
Hawking, D., "Overview of the TREC-9 Track", TREC, 2000, pp. 1-16.
Hawking., D. et al., "Overview of TREC-7 Very Large Collection Track", TREC, Jan. 1999, pp. 1-13.
Heery, Rachel, "Review of Metadata Formats", Program, vol. 30, No. 4, Oct. 1996, 1996 IEEE, pp. 345-373.
Kotsakis, E., "Structured Information Retrieval in XML Documents", Proceedings of the ACM Symposium on Applied Computing, Madrid, Spain, 2002, pp. 663-667.
Kucuk, Mehmet Emin, et al., "Application of Metadata Concepts to Discovery of Internet Resources", ADVIS 2000, INCS 1909, pp. 304-313, 2000.
Lalmas, M., "Uniform Representation of Content and Structure for Structured Document Retrieval", $20^{th}$ SGES International Conference on Knowledge Based Systems and Applied Artificial Intelligence, Cambridge, UK, Dec. 2000, pp. 1-12.
Larkey, Leah S., et al., "Collection Selection and Results Merging with Topically Organized U.S. Patents and TREC Data", Proceedings of the Ninth International Conference on Information Knowledge Management, CIKM 2000, Nov. 6-11, 2000, pp. 282-289.
Nelson, Chris, "Use of Metadata Registries for Searching for Statistical Data", IEEE 2002, Dimension EDI Ltd., pp. 232-235, 2002.
Ogilvie, P. et al., "Combining Document Representations for Known-Item Search", Proceedings of the $26^{th}$ Annual International ACM SIGIR Conference on Research and Development in Information Retrieval, Toronto, Canada, 2003, pp. 143-150.
Robertson, S. et al., "Okapi at TREC-4", 1996, 24 pp.
Robertson, S. et al., "Some Simple Effective Approximations to the 2-Poisson Model for Probabilistic Weighted Retrieval", Proceedings of the $17^{th}$ Annual International ACM SIGIR Conference on Research and Development in Information Retrieval, 1994, pp. 232-241.
Schulz, Stefan, et al., "Indexing Medical WWW Documents by Morphemes", MEDINFO 2001 Proceedings of the $10^{th}$ World Congress on Medical Informatics, Park I, IOS Press, Inc., pp. 266-270, 2001.
Singhal, A. et al., "AT&T at TREC-9", Proceedings of the Ninth Text Retrieval Conference, NIST Special Publication 500-249, 'Online! 2001, pp. 103-105.

Sturdy, Derek, "Squirrels and nuts: metadata and knowledge management", Business Information Review, 18(4), pp. 34-42, Dec. 2001.
Voorhees, E., "Overview of TREC 2002", Gaithersburg, Maryland, Nov. 19-22, 15 pp.
Web Page "Reuters: Reuters Corpus", http://about.reuter.com/researchandstandards/corpus/, viewed Mar. 18, 2004.
Westerveld, T. et al., "Retrieving Web pages using Content, Links, URLs and Anchors", Proceedings of the Tenth Text Retrieval Conference, NIST Special Publication, 'Online! Oct. 2001, pp. 1-10.
Wilkinson, R., "Effective Retrieval of Structured Documents", Annual ACM Conference on Research and Development, 1994, 7 pp.
Yi, Jeonghe,e et al., "Metadata Based Web Mining for Topic-Specific Information Gathering", IEEE, pp. 359-368, 2000.
Yi, Jeonghee, et al., "Using Metadata to Enhance Web Information Gathering", D.Suciu and G. Vossen (eds.): WebDB 2000, LNCS 1997, pp. 38-57, 2001.
"Microsoft SharePoint Portal Server 2001 Resource Kit: Chapter 24, Analyzing the Default Query for the Dashboard", http://www.microsoft.com/technet/prodtechnol/sppt/sharepoint/reskit/part5/c24spprk.mspx, printed on May 22, 2006, 5 pp.
"Microsoft Full-Text Search Technologies", http://www.microsoft.com/technet/prodtechnol/sppt/sharepoint/evaluate/featfunc/mssearc . . . , published on Jun. 1, 2001, printed on May 22, 2006, 13 pp.
"Microsoft External Content in Microsoft Office SharePoint Portal Server 2003", http://www.microsoft.com/technet/prodtechnol/sppt/reskit/c2261881x.mspx, published on Jun. 9, 2004, printed on May 22, 2006, 20 pp.
"Planning Your Information Structure Using Microsoft Office SharePoint Portal Server 2003", http://www.microsoft.com/technet/prodtechnol/sppt/reskit/c0861881x.mspx, published on Jun. 9, 2004, printed on May 22, 2006, 22 pp.
Bandinelli, Luca, "Using Microsoft SharePoint Products and Technologies in Multilingual Scenarios", http://www.microsoft.com/technet/prodtechnol/office/sps2003/maintain/spmultil.mspx, published on Nov. 1, 2003, printed on May 22, 2006, 32 pp.
"SharePoint Portal Server 2001 Planning and Installation Guide", http://www.microsoft.com/technet/prodtechnol/sppt/sharepoint/plan/planinst.mspx, printed on May 22, 2006, 86 pp.
U.S. Appl. No. 11/019,091, filed Dec. 21, 2004 entitled "Ranking Search Results Using Feature Extraction".
U.S. Appl. No. 11/073,381, filed Mar. 3, 2005 entitled "System and Method for Ranking Search Results Using File Types".
U.S. Appl. No. 10/804,326, filed Mar. 18, 2004 entitled "Field Weighting in Text Document Searching".
U.S. Appl. No. 10/609,315, filed Jun. 27, 2003, entitled "Normalizing Document Metadata Using Directory Services".
U.S. Appl. No. 11/412,723, filed Apr. 26, 2006, entitled "Ranking Search Results Using Language Types".
U.S. Appl. No. 10/955,462, filed Sep. 30, 2004 entitled "System and Method for Incorporating Anchor Text Into Ranking Search Results".
Official Action in U.S. Appl. No. 10/609,315 mailed Dec. 15, 2005.
Official Action in U.S. Appl. No. 10/609,315 mailed Jun. 1, 2006.
Najork, Marc et al., "Breadth-First Crawling Yields High-Quality Pages", ACM, Compaq Systems Research Center, Hong Kong, 2001, pp. 114-118.
Chakrabarti, S., "Recent Results in Automatic Web Resource Discovery", ACM Computing Surveys, vol. 31, No. 4es, Dec. 1999, pp. 1-7.
Lam et al., "Automatic Document Classification Based on Probabilistic Reasoning: Model and Performance Analysis", IEEE, 1997, pp. 2719-2723.
Lee, J.K.W. et al., "Intelligent Agents for Matching Information Providers and Consumers on the Worl-Wide Web", IEEE, 1997, pp. 189-199.
Huang et al., "Design and Implementation of a Chinese Full-Text Retrieval System Based on Probabilistic Model", IEEE, 1993, pp. 1090-1093.
Yuwono, Budi and Lee, Dik L., "Search and Ranking Algorithms for Locating Resources on the World Wide Web", IEEE, 1996, pp. 164-170.
U.S. Official Action in U.S. Appl. No. 10/981,962 mailed Apr. 5, 2006.
U.S. Official Action in U.S. Appl. No. 10/981,962 mailed Sep. 21, 2006.
U.S. Official Action in U.S. Appl. No. 10/804,326 mailed Oct. 16, 2006.
U.S. Official Action in U.S. Appl. No. 10/955,462 mailed Nov. 3, 2006.
U.S. Official Action in U.S. Appl. No. 10/955,983 mailed Mar. 22, 2007.
U.S. Official Action in U.S. Appl. No. 10/981,962 mailed Apr. 30, 2007.
U.S. Official Action in U.S. Appl. No. 10/955,462 mailed May 11, 2007.
U.S. Official Action in U.S. Appl. No. 11/019,091 mailed Jun. 20, 2007.
U.S. Official Action in U.S. Appl. No. 10/955,462 mailed Sep. 10, 2007.
U.S. Official Action in U.S. Appl. No. 10/955,983 mailed Nov. 13, 2007.
U.S. Official Action in U.S. Appl. No. 10/804,326 mailed Dec. 11, 2007.
U.S. Official Action in U.S. Appl. No. 10/981,962 mailed Mar. 17, 2008.
U.S. Official Action in U.S. Appl. No. 11/412,723 mailed May 28, 2008.
U.S. Official Action in U.S. Appl. No. 11/019,091 mailed Apr. 3, 2008.
EP Search Report in EP 00309121 mailed Jul. 18, 2002.
EP Exam Report in EP 00309121.2-1522 mailed Jul. 4, 2003.
EP Exam Report in EP 00309121.2-1527 mailed Jun. 16, 2004.
EP Search Report in EP 05105048 mailed Jan. 17, 2006.
EP Search Report in EP 05105110 dated Aug. 11, 2006.
EP Exam Report in EP 00309121.2-1527 mailed Feb. 8, 2007.
Agichten et al., "Improving Web Search Ranking by Incorporating User Behavior Information"—http://www.mathcs.emory.edu/~eugene/papers/sigir2006ranking.pdf, 8 pp.
Burges, Christopher J.C. et al. "Learning to Rank with Nonsmooth Cost Functions"—http://books.nips.cc/papers/txt/nips19/NIPS2006_0574.txt, 2 pp.
Chen, Michael et al., Cha Cha, "A System for Organizing Intranet Search Results", Computer Science Department, University of California, Berkeley, 1999, pp. 1-12.
Fagin, Ronald, "Searching the Workplace Web", Mar. 3, 2005, pp. 1-10.
Ljosland, Mildrid, "Evaluation of Web Search Engines and the Search for Better Ranking Algorithms," http://www.aitel.hist.no/~mildrid/dring/paper/SIGIR.html, SIGIR99 Workshop on Evaluation of Reb Retrieval, Aug. 19, 1999, 5 pages.
Losee, Robert M. et al., "Measuring Search Engine Quality and Query Difficulty: Ranking with Target and Freestyle," http://ils.unc.edu/~losee/paril.pdf, Journal of the American Society for Information Science, Jul. 29, 1999, 20 pages.
Matveeva, Irina et al., "High Accuracy Retrieval with Multiple Nested Ranker," http://people.cs.uchicago.edu/~matveeva/RankerSIGIR06.pdf, *SIGIR'*06, Seattle, WA Aug. 6-11, 2006, 8 pages.
Microsoft SharePoint Portal Server 2001 White Paper, "Microsoft SharePoint Portal Server: Advanced Technologies for Information Search and Retrieval," http://download.microsoft.com/download/3/7/a/37a762d7-dbe6-4b51-a6ec-f6136f44fd65/SPS_Search.doc, Jun. 2002, 12 pages.
MSDN, "Understanding Ranking," http://msdn.microsoft.com/en-us/library/ms142524.aspx, Sep. 2007, 4 pp.
Radlinski, et al.,, "Query Chains: Learning to Rank from Implicit Feedback,"http://delivery.acm.org/10.1145/1090000/1081899/p239-radlinski.pdf?key1=1081899&key2=3628533811&coll=GUIDE& CFID=27212902&CFTOKEN=53118399, *KDD'*05, Chicago, IL, Aug. 21-24, 2005,10 pages.
Senecal, Sylvain, "Consumers' Decision-Making Process and Their Online Shopping Behavior: A Clickstream Analysis", Jun. 1, 2004, pp. 1600-1607.

Shamsfard, Mehrnoush, et al., "ORank: An Ontology Based System for Ranking Documents," http://www.waset.org/ijcs/v1/v1-3-30.pdf, International Journal of Computer Science, vol. 1, No. 3, Apr. 10, 2006, pp. 225-231.

Smyth Barry "Relevance at a Distance—An Investigation of Distance-Biased Personalization on the Mobile Internet", no date, pp. 1-6.

Taylor et al., "Optimisation Methods for Ranking Functions with Multiple Parameters"—http://delivery.acm.org/10.1145/1190000/1183698/p585-taylor.pdf?key1=1183698&key2=3677533811&coll=GUIDE&dl=GUIDE&CFID=22810237&CFTOKEN=34449120, pp. 585-593.

Wen, Ji-Rong, "Query Clustering Using User Logs", Jan. 2002, pp. 59-81.

Xue, Gui-Rong, et al., "Optimizing Web Search Using Web Click-Through Data," http://people.cs.vt.edu/~xwensi/Publication/p118-xue.pdf, *CIKM'*04, Nov. 8-13, 2004, 9 pages.

U.S. Appl. No. 09/493,748, filed Jan. 28, 2000 entitled "Adaptive Web Crawling Using a Statistical Model".

U.S. Appl. No. 11/874,844, filed Oct. 18, 2007 entitled "Enterprise Relevancy Ranking Using a Neural Network".

U.S. Appl. No. 11/874,579, filed Oct. 18, 2007 entitled "Ranking and Providing Search Results Based in Part on a Number of Click-Through Features".

U.S. Appl. No. 12/207,910, filed Sep. 10, 2008 entitled "Document Length as a Static Relevance Feature for Ranking Search Results".

U.S. Official Action in U.S. Appl. No. 10/804,326 mailed Jun. 7, 2007.

U.S. Official Action in U.S. Appl. No. 11/073,381 mailed Sep. 18, 2007.

U.S. Official Action in U.S. Appl. No. 11/073,381 mailed Jul. 10, 2008.

U.S. Official Action in U.S. Appl. No. 11/206,286 mailed Jul. 14, 2008.

U.S. Official Action in U.S. Appl. No. 10/955,983 mailed Jul. 21, 2008.

U.S. Official Action in U.S. Appl. No. 10/804,326 mailed Dec. 10, 2008.

U.S. Official Action in U.S. Appl. No. 11/019,091 mailed Dec. 11, 2008.

U.S. Official Action in U.S. Appl. No. 10/955,983 mailed Dec. 18, 2008.

U.S. Official Action in U.S. Appl. No. 11/206,286 mailed Dec. 24, 2008.

PCT Search Report in PCT/US2006/031965 mailed Jan. 11, 2007.

EP Exam Report in EP 05105048.2-2201 mailed Apr. 23, 2007.

Chinese First Official Action in 200510088527.5 mailed Apr. 18, 2008.

Chinese First Official Action in 200510088213.5 mailed May 9, 2008.

Chinese Second Official Action in 200510088213.5 mailed Oct. 10, 2008.

Chinese Second Official Action in 200510088527.5 mailed Dec. 26, 2008.

Chen, Hsinchun et al., "A Smart Itsy Bitsy Spider for the Web", Journal of the American Society for Information Science, 49(7), 1998, pp. 604-618.

Kleinberg, Jon M., "Authoritative Sources in a Hyperlinked Environment", Proceedings of the aCM-SIAM symposium on Discrete Algorithms, 1998, 34 pp.

U.S. Official Action in U.S. Appl. No. 11/412,723 mailed Mar. 6, 2009.

U.S. Official Action in U.S. Appl. No. 11/073,381 mailed Apr. 15, 2009.

U.S. Official Action in U.S. Appl. No. 10/955,983 mailed Jun. 10, 2009.

PCT Search Report in PCT/US2008/011894 mailed Feb. 27, 2009.

Chinese Final Rejection in 200510088213.5 mailed Mar. 6, 2009.

Chinese First Official Action mailed Jun. 19, 2009 in 200680029645.1.

Chinese First Official Action mailed Jun. 19, 2009 in 200680035828.4.

U.S. Official Action in U.S. Appl. No. 11/019,091 mailed Sep. 1, 2009.

U.S. Official Action in U.S. Appl. No. 11/412,723 mailed Sep. 3, 2009.

Chinese Third Official Action in 200510088213.5 mailed Sep. 4, 2009.

Japanese Notice of Rejection in 2008-527094 mailed Sep. 11, 2009.

U.S. Official Action in U.S. Appl. No. 11/073,381 mailed Sep. 29, 2009.

U.S. Official Action in U.S. Appl. No. 11/874,844 mailed Nov. 13, 2009.

U.S. Official Action in U.S. Appl. No. 11/412,723 mailed Mar. 11, 2010.

U.S. Official Action in U.S. Appl. No. 11/073,381 mailed Apr. 12, 2010.

Japanese Final Rejection in 2008-527094 mailed Jan. 22, 2010.

Egyptian Official Action in PCT 269/2008 mailed Feb. 1, 2010.

Chinese Second Office Action in 200680029645.1 mailed Apr. 6, 2010.

Agarwal et al., "Ranking Database Queries Using User Feedback: A Neural Network Approach", Fall 2006, 9 pp.

U.S. Official Action in U.S. Appl. No. 11/874,579 mailed Jun. 22, 2010.

* cited by examiner

CLICK DISTANCE DETERMINATION

CROSS-REFERENCE TO RELATED APPLICATIONS

The present patent application is a continuation-in-part application of U.S. patent application Ser. No. 10/955,983, entitled "System and Method for Ranking Search Results Using Click Distance", filed on Sep. 30, 2004 now U.S. Pat. No. 7,761,448 and incorporated herein by reference.

BACKGROUND

In a text document search, a user typically enters a query into a search engine. The search engine evaluates the query against a database of indexed documents and returns a ranked list of documents that best satisfy the query. A score, representing a measure of how well the document satisfies the query, is algorithmically generated by the search engine. Commonly-used scoring algorithms rely on splitting the query up into search terms and using statistical information about the occurrence of individual terms in the body of text documents to be searched. The documents are listed in rank order according to their corresponding scores so the user can see the best matching search results at the top of the search results list.

Another evaluation that certain search engines may employ to improve the quality of the results is to modify the rank of the results by a selected ranking function. One exemplary ranking function determines that when one page links to another page, it is effectively casting a vote for the other page. The more votes that are cast for a page, the more important the page. The ranking function can also take into account who cast the vote. The more important the page, the more important their vote. These votes are accumulated and used as a component of the ratings of the pages on the network.

A ranking function is used to improve the quality of the ranking. However, the effectiveness of the ranking function may be affected by the topology of the network. For example, the ranking function using the votes described above may be less effectual in an intranet setting. An intranet is a network that uses some of the same protocols as the Internet, but is accessible only by a subset of users, such as employees of a corporation. The pages of an intranet are not structured or connected exactly like the Internet, and so the relevancy of the results produced by a ranking function may not be reduced as compared to the Internet setting.

SUMMARY

Aspects of the present invention are related to providing a fast click distance determination for ranking search results according to click distance. The click distance is determined in a relatively short period of time with relation to other click distance determination methods. Click distance is a query-independent relevance measure that measures the number of "clicks" required to reach a given page of a web site. Documents on a network are often organized into a tree structure, with a root node and subsequent branches extending to other nodes from that root. Often the root node of the intranet is referred to as its homepage.

In the tree structure, the click distance is represented by the number of branches traversed on the path from the root node. Once the click distance is determined for a page, the click distance may be incorporated into the score for the page. The page's score incorporating the click distance determines the page's rank among the other pages within the search results.

In accordance with one aspect, the network is first "crawled" to generate a table of properties associated with the links and pages of the network. "Crawling" refers to automatically collecting several documents (or any analogous discrete unit of information) into a database referred to as an index. Crawling traverses multiple documents on the network by following document reference links within certain documents, and then processing each document as found. The documents are processed by identifying key words or general text in the documents to create the index.

An exemplary index can be an inverted list that has a column of words and a column indicating in which documents those words can be found. When a user enters in one or more search terms, the results are obtained and a ranking algorithm is applied that includes the click distance function. The click distance function, based on the determined click distance for a page, positively or negatively affects the score of certain pages, refining the results returned to the user.

The click distance determination described herein, reduces the time required to determine the click distance by making the click distance determination locally with relation to the ranking engine that ranks the search results. A special word, identifying a source document, is included in an inverted index and makes the association between the source document and a list target of documents that share that source document. Traversing the inverted index allows the click distance to be determined by examining these specialized words and the lists of documents to which they relate. The inverted index is examined without the need to repeatedly and expensively refer other data tables or the corpus of documents itself.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Embodiments of the present invention are described more fully below with reference to the accompanying drawings, which form a part hereof, and which show specific exemplary embodiments for practicing the invention. However, embodiments may be implemented in many different forms and should not be construed as limited to the embodiments set forth herein; rather, these embodiments are provided so that this disclosure will be thorough and complete, and will fully convey the scope of the invention to those skilled in the art. Embodiments of the present invention may be practiced as methods, systems or devices. Accordingly, embodiments of the present invention may take the form of an entirely hardware implementation, an entirely software implementation or an implementation combining software and hardware aspects. The following detailed description is, therefore, not to be taken in a limiting sense.

The logical operations of the various embodiments of the present invention are implemented (1) as a sequence of computer implemented steps running on a computing system and/or (2) as interconnected machine modules within the computing system. The implementation is a matter of choice dependent on the performance requirements of the computing system implementing the invention. Accordingly, the logical operations making up the embodiments of the present invention described herein are referred to alternatively as operations, steps or modules.

Illustrative Operating Environment

Figure 1:
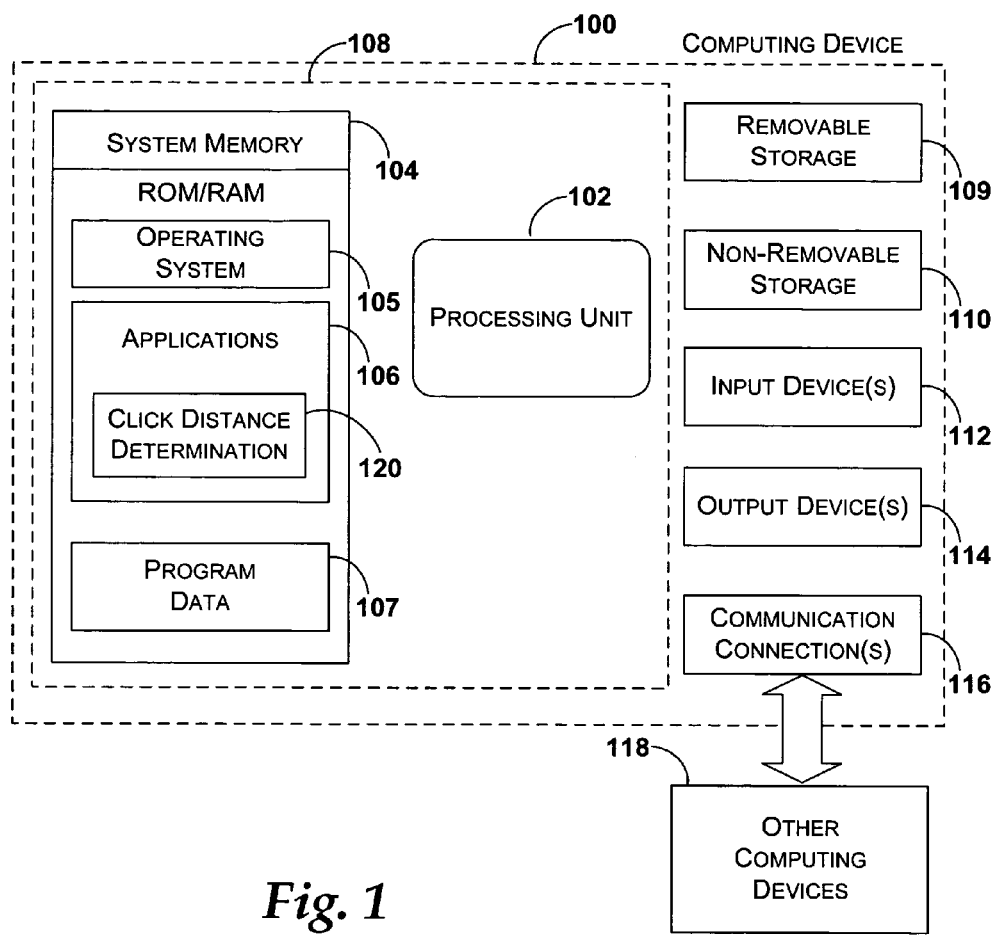
FIG. 1 illustrates an exemplary computing device that may be used in one exemplary embodiment.

With reference to FIG. 1, one exemplary system for implementing the invention includes a computing device, such as computing device 100. Computing device 100 may be configured as a client, a server, mobile device, or any other computing device. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 includes a click distance determination application 120 for implementing the functionality of the present invention. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 also contains communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Illustrative Embodiments for Fast Click Distance Determination

An embodiment executed by a system including computing device 100 provides for determining the click distance for a particular document included on a network. The click distance, determined as described herein, may then be used for refining the ranking of search results produced by a search engine.

Except for a broader meaning that allows the disclosure and claims herein to encompass a wider variety of alternative embodiments, the following terms as used herein and throughout the claims are generally defined as follows:

"Anchor text" is generally defined as the text that is associated with a link included in a source document that directs navigation to a target document. For the purposes of search queries, the anchor text included in the source document enhances the ranking of the target document. For example, when a query matches words in some anchor text, the target document of that anchor gets a boost in the relevance ranking.

"Click distance" generally refers to the minimal number of clicks or links needed to navigate between two documents (e.g., doc1 and doc2). If doc1 is a commonly recognized page of the web, with a high level of credibility ("authority"), then the credibility of the doc2 gets a boost if the click distance between the two documents is small. The level of credibility (or authority) of a page is a query independent relevance measure that may be used in the ranking algorithm of a search engine.

"Document" generally refers to any possible resource that may be returned as the result of a search query or crawl of a network, such as network documents, files, folders, web pages, and other resources.

Embodiments of the present invention are generally related to producing a click distance determination so that the click distance determination may be used to refine a ranking function for a search engine. The quality of a search engine is typically determined by the relevance of the documents according to the ranks assigned by the ranking function. The ranking function may be based on multiple features. Some of these features may depend on the query, while others are considered query independent. Click distance is a query-independent relevance measure from a homepage or an authoritative URL to the given page. On a web graph (see FIGS. 3 and 4 below), the click distance can be represented as the shortest path between the authority page and the given page. In a previous embodiment, an algorithm performed breadth first traversal and computed the distance between a given node to all other nodes in the graph. The traversal took N iterations to complete, where N is the diameter of the graph (maximum shortest distance). The variable N may be smaller than the total number of nodes on the graph.

Figure 2:
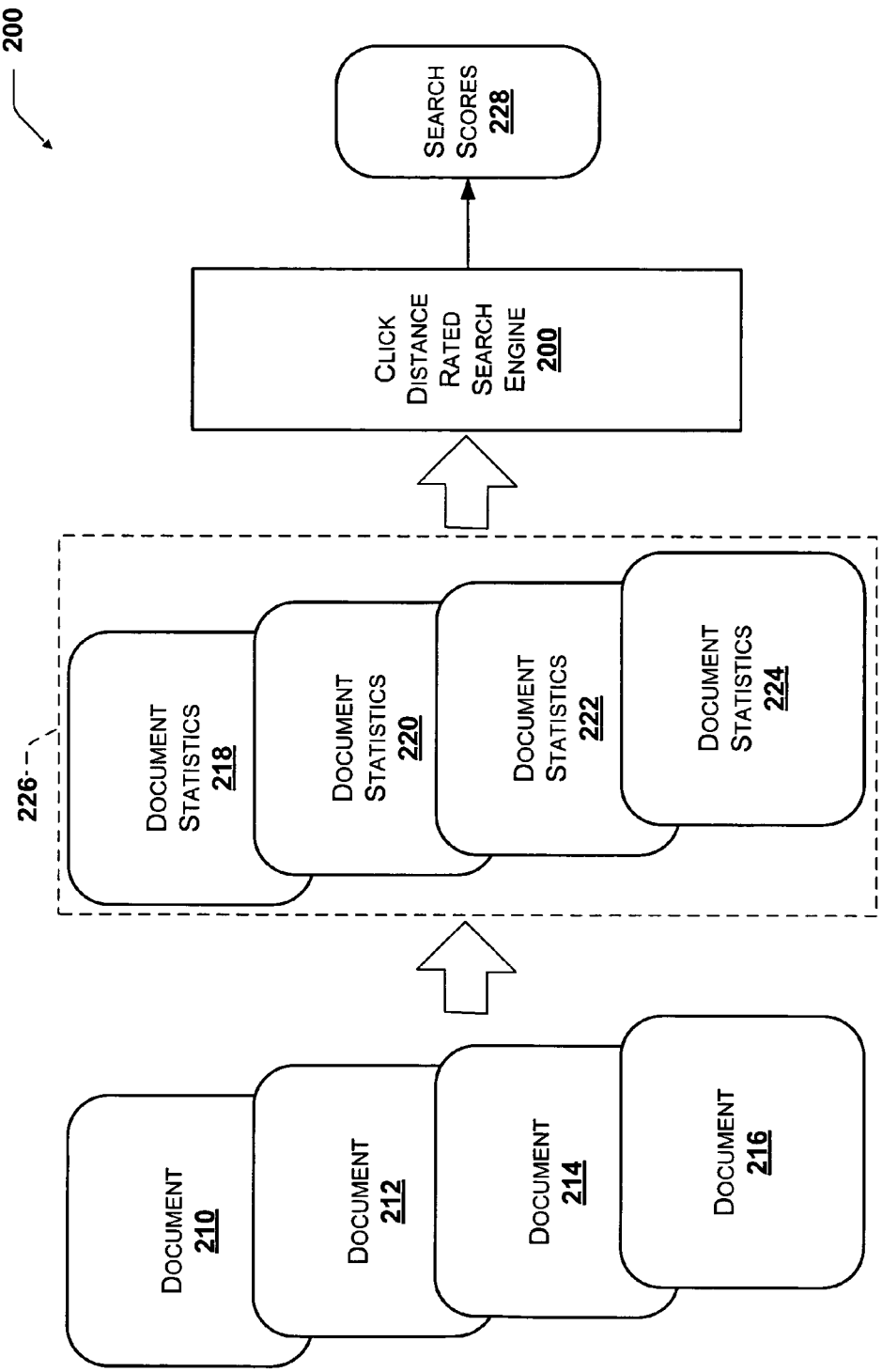
FIG. 2 illustrates a system for ranking search results that may include functionality for a fast determination of click distance.

FIG. 2 illustrates a system for ranking search results that may include functionality for a fast determination of click distance in accordance with the present invention. The search engine 200 receives a query containing multiple query terms. Each query term may include multiple component terms, such as when the query term is a phrase (e.g., the phrase "document management system" may be considered a single query term"). In addition, a query may include one or more operators, such as Boolean operators, constraints, etc., which are commonly supported by known search engines.

A plurality of documents on a distributed network, represented by documents 210, 212, 214, and 216, are available for searching. In practice, a search engine may search any number of documents and typically search collections containing large numbers (e.g., millions) of documents. The volume of documents may be reduced from an Internet setting to an intranet setting, but the reduction is usually from billions to millions so that the relative number of documents is still quite large. An indexing module (not shown) generates individual document statistics (e.g., 218, 220, 222, and 224) for each document. The document statistics are stored in an index 226.

Search engine 200 consults index 226 to determine a search score 228 for each document based on the query and the corresponding document statistics. In the present invention, one of the documents statistics included is the click distance of the document. In another embodiment, another document statistic included is the URL depth associated with the document. Click distance and URL depths are then combined with query dependent statistics to form a document's final score. Typically, document scores 228 are then ranked in descending order to give the user a list of documents that are considered by the search algorithm to be most relevant to the query.

In the illustrated system, the search engine 200 represents a click distance ranking search engine, which considers the click distance of a document in determining the document's search score. In one instance, the click distance from the homepage is a measure of the importance of the page, where pages closer in the hierarchy to the authoritative are considered more important than the pages lower in the hierarchy. However, other scenarios may exist where the opposite holds true, where documents lower in the hierarchy are considered more than those pages higher in the hierarchy. Click distance is therefore considered a query-independent relevance measure since it rates the document's importance overall rather than according to the query (e.g., a query-dependent ranking function would be counting the number of times a search term appears in a document).

Figure 3:
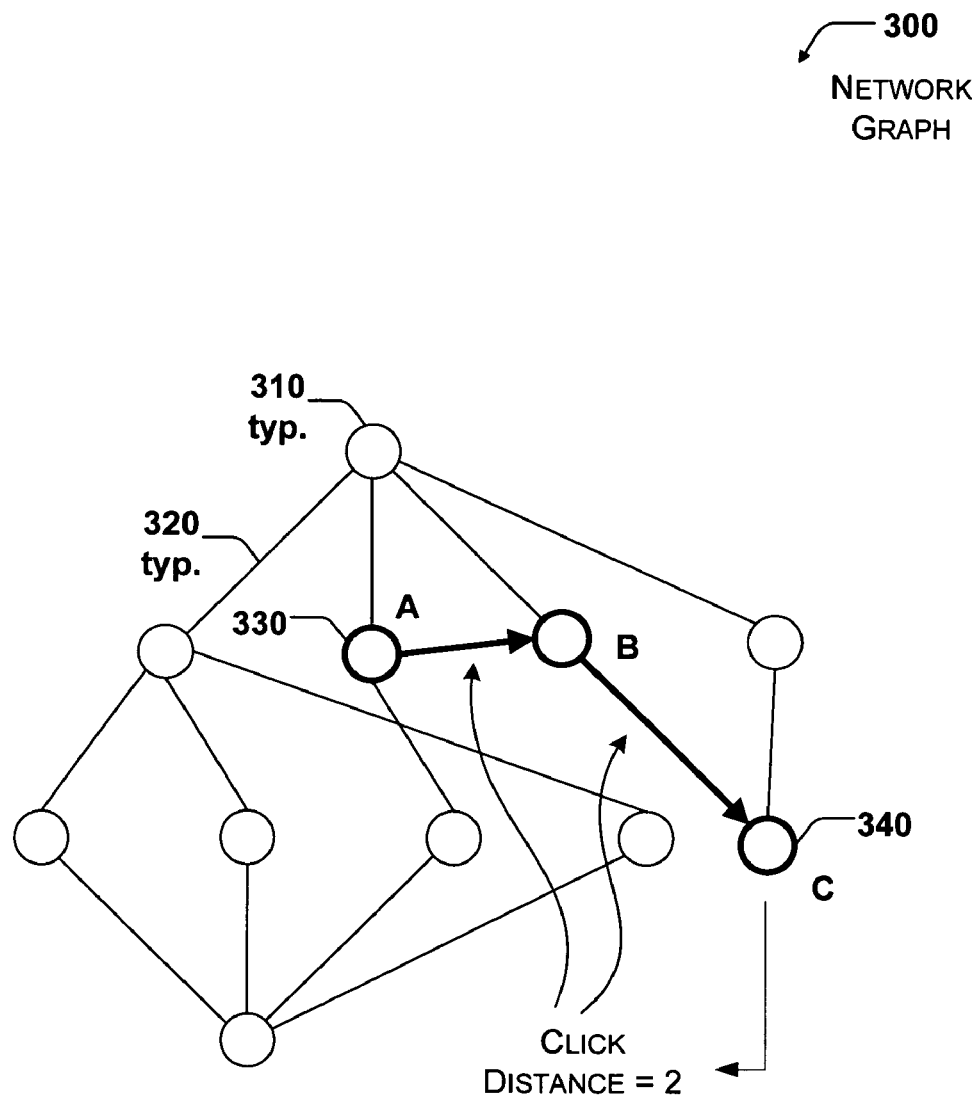
FIG. 3 illustrates an exemplary network graph.

FIG. 3 illustrates an exemplary network graph in accordance with the present invention. The network graph is comprised of nodes (e.g., 310) and edges or links (e.g., 320). The nodes (e.g., 310) represent the pages and other resources that are on the network that may be returned as results to a search query. The links (e.g., 320) connect each one of these pages together through the use of navigation links listed on the pages. A set of link information may be gathered for each page that can be used in calculating the click distance for a particular page.

In one embodiment, node 330 represents the highest authority page or root node on the network for a group of documents. The click distance for the remaining pages of the network may be calculated from node 330. For example, node 340 has a click distance of two "clicks" from node 330. As stated above, "clicks" refers to the number of branches traversed on the shortest path from the highest authority node. Other paths from node 330 could have been chosen to reach node 340, but click distance is concerned with the shortest path.

Network graph 300 is shown with nodes that do not conform to a particular order, and may be similar to the Internet in that aspect. With the lack of order, the applicability of click distance for ranking pages may be difficult to conceptualize. However, often the network of pages and resources does conform to an applied order as shown in FIG. 4 below.

Figure 4:
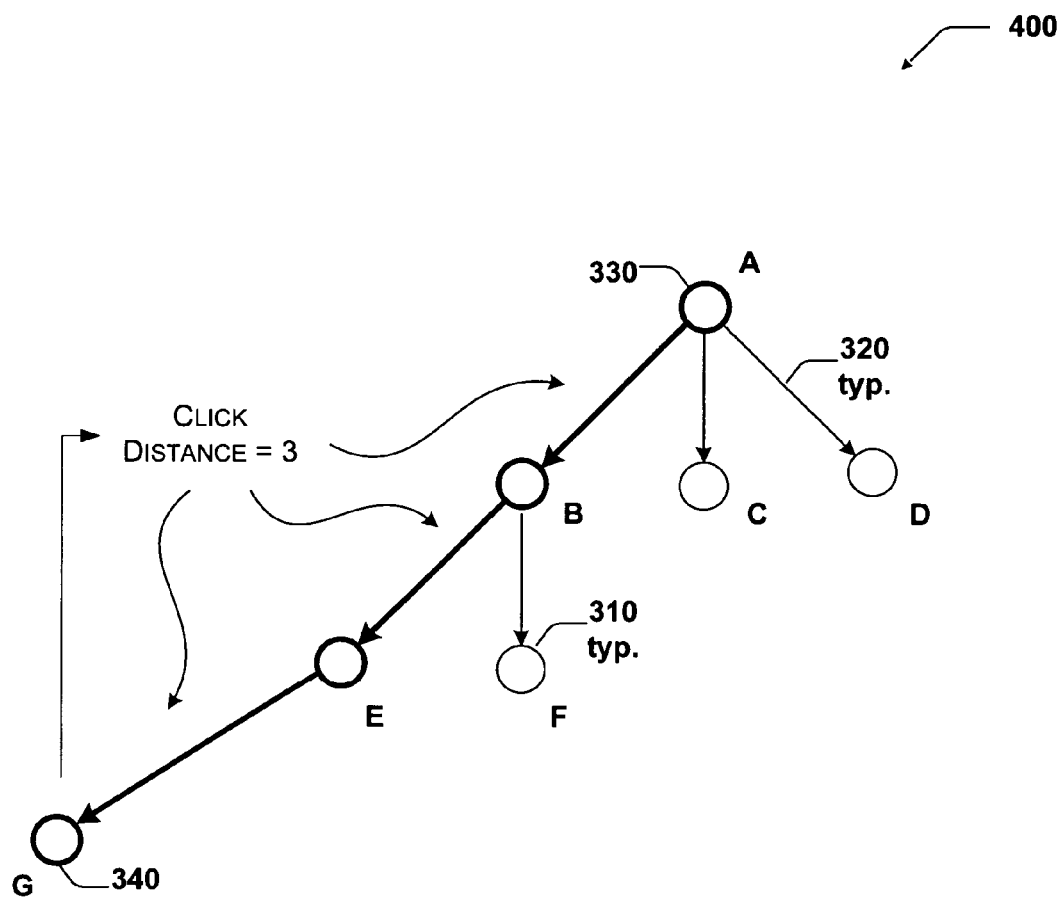
FIG. 4 illustrates an exemplary hierarchical network graph.

FIG. 4 illustrates an exemplary hierarchical network graph in accordance with the present invention. Hierarchical network graph 400 is similar to network graph 300 shown in FIG. 3 in that it also includes nodes (e.g., 410) and links (e.g., 420). However, hierarchical network graph 400 is based on the inherent hierarchy of a structured site or intranet. Accordingly, hierarchical network graph 400 may be conceptualized as a tree structure with branches extending from a root node.

For hierarchical network graph 400, the applicability and calculation of click distance is more recognizable. For example, node 330 corresponds to the highest authority node or root node of the tree. Node 340 therefore has an associated click distance of 3, being 3 clicks or user navigations from the root node. Stated differently, since a user is required to traverse 3 branches of the tree to navigate from node 330 to node 340, the click distance is also 3.

The network graphs represented in FIGS. 3 and 4 are examples of graphs that are constructed in memory during the indexing of the documents for calculating the click distance. Constructing a graph during indexing allows the click distance to be included among the document statistics stored in the index and used for ranking the pages.

Figure 5:
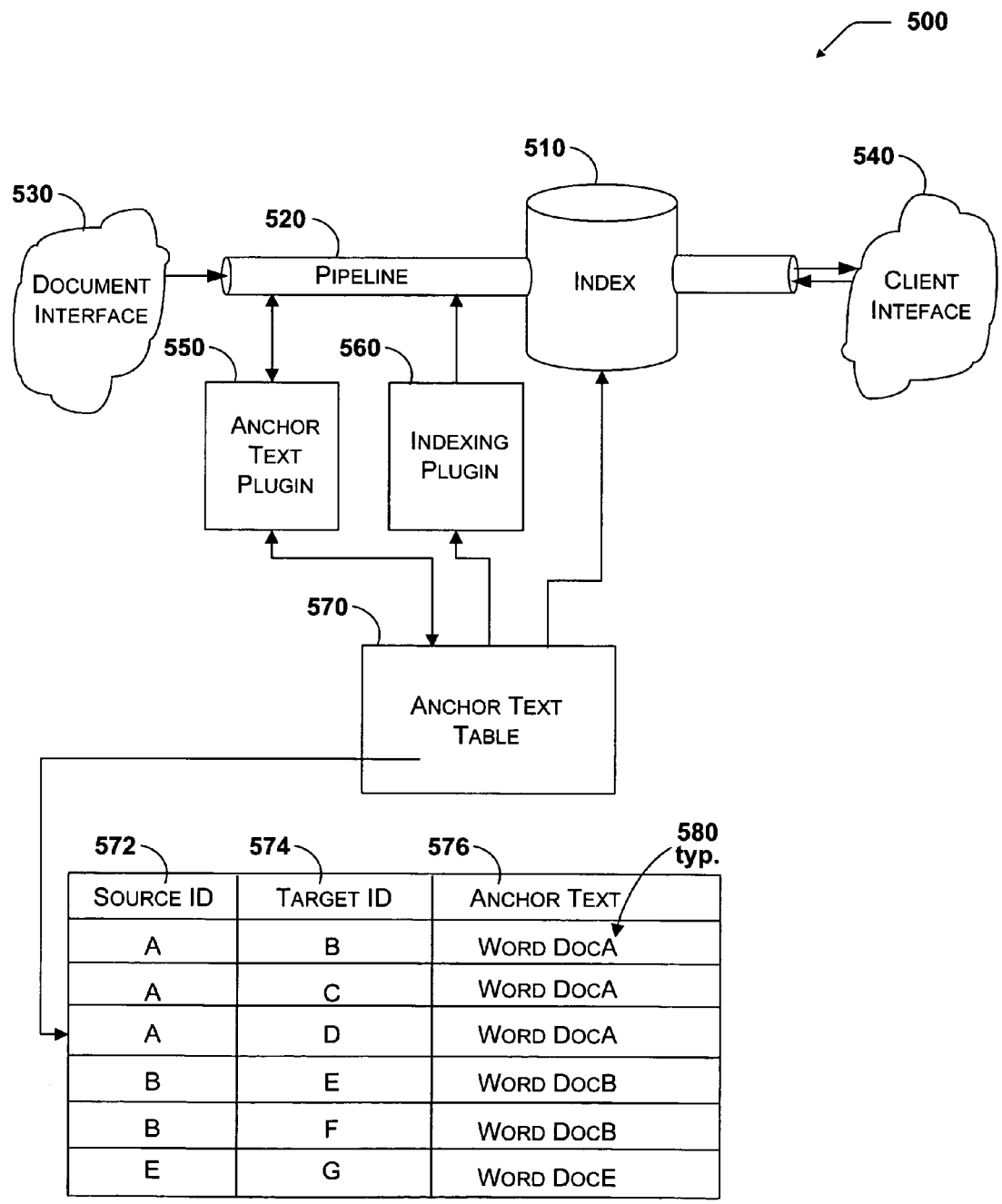
FIG. 5 illustrates a functional block diagram of an exemplary system for indexing documents.

FIG. 5 illustrates a functional block diagram of an exemplary system for indexing documents in accordance with the present invention. System 500 includes index 510, pipeline 520, document interface 530, client interface 540, anchor text plugin 550, indexing plugin 560, and anchor text table 570.

Index 510 is structured to include separate index partitions that includes a main partition and another partition for the anchor text. In another embodiment, a separate anchor text index is supplied in addition to the inverted index represented by index 510. A more detailed description of the structure of index 510 is provided below in the discussion of FIG. 6. The records of these indexes are used to in providing results to client queries. In one embodiment, index 510 corresponds to multiple databases that collectively provide the storage for the index records.

Pipeline 520 is an illustrative representation of the gathering mechanism for obtaining the documents or records of the documents for indexing. Pipeline 520 allows for filtering of data by various plugins (e.g., anchor text plugin 550) before the records corresponding to the data are entered into index 510.

Document interface 530 provides the protocols, network access points, and database access points for retrieving documents across multiple databases and network locations. For example, document interface 530 may provide access to the Internet while also providing access to a database of a local server and access to a database on the current computing device. Other embodiments may access other document locations using a variety of protocols without departing from the spirit or scope of the invention.

Client Interface 540 provides access by a client to define and initiate a search. The search may be defined according to keywords, index keys, and/or "scope keys". Scope keys refer to words that are used to further narrow the scope of a search query. For example, a scope key may be associated with a particular file type. A search using that scope key as search term limits the scope of the search results to documents corresponding to that file type. With scope keys, the scope of the search can be narrowed according to attributes such as file types, locations such as certain databases or URLs, or by other criteria that reduces the number of documents to be searched.

Anchor text plugin 550 is one of several gatherer pipeline plugins. Anchor text plugin 550 identifies the anchor text and its related properties that are included in a document. The anchor properties are gathered by anchor text plugin 550 as the documents provided through document interface 530 are crawled. In one embodiment, the functionality of anchor text plugin 550 is actually included in a properties plugin rather than being provided as a separate plugin. The properties plugin identifies all the fields of a document and their associated properties including the anchor properties. In one embodiment, since anchor text is associated with a target document, associating the target document with the anchor text is deferred until the crawl is complete. For example, when document A is indexed, and document A has anchor text that points to document B, the anchor text is applied to document B. But since document A is being indexed at the moment, this process is deferred. Also, there may be multiple anchors are to be applied to document B requiring that they are discovered before document B is indexed correctly. Deferring, the indexing of the target documents until after the crawl is complete improves the correctness of the indexed results, but is not the only method available.

Indexing plugin 560 is another plugin connected to pipeline 520. Indexing plugin provides the mechanism for generating, partitioning, and updating index 510. In one embodiment, indexing plugin 560 provides the word lists that temporarily cache the keywords and anchor text keys generated from crawled documents before flushing these results to index 510. The records of index 510 are populated from the crawl results included in these word lists.

Anchor text table 570 includes the anchor properties that have been gathered by anchor text plugin 550. For an instance of anchor text in a document, anchor text table 570 includes a record of the anchor text and the properties associated with the anchor text. In the example illustrated, a record in anchor text table 570 may include source ID 572 that identifies the current document, target ID 574 that identifies the target document of the link, anchor text entry 576, and link 578 in separate fields. In other embodiments, other fields may be included in anchor text table 570.

For implementing the fast click distance determination, a specialized word (e.g., 580), or scope key, is appended to the anchor text in anchor text entry 576. This specialized word (e.g., 580) provides a designation of the source document for the target document included in the record of anchor text table 570. Examining the first record of anchor text table 570, the specialized word is "DocA" to designate that the source of the anchor text is document A. In one embodiment, each document is identified by a document ID. The specialized word is therefore a variation of the document ID that provides a unique word for adding to the anchor text index that associates the target document with the source document.

With the properties added to anchor text table 570, the anchor and link properties gathered from the crawl may be used to generate a representation of the network, or anchor graph, with nodes corresponding to the documents and branches corresponding to the links (see FIG. 4). This anchor graph may then be loaded into memory and used to resolve the fast click distance determination.

Despite the illustration in system 500 of one-way and two-way communications between functional blocks, any of these communication types may be changed to another type without departing from the spirit or scope of the invention (e.g., all communications may have an acknowledgment message requiring two-way rather than one-way communication).

Figure 6:
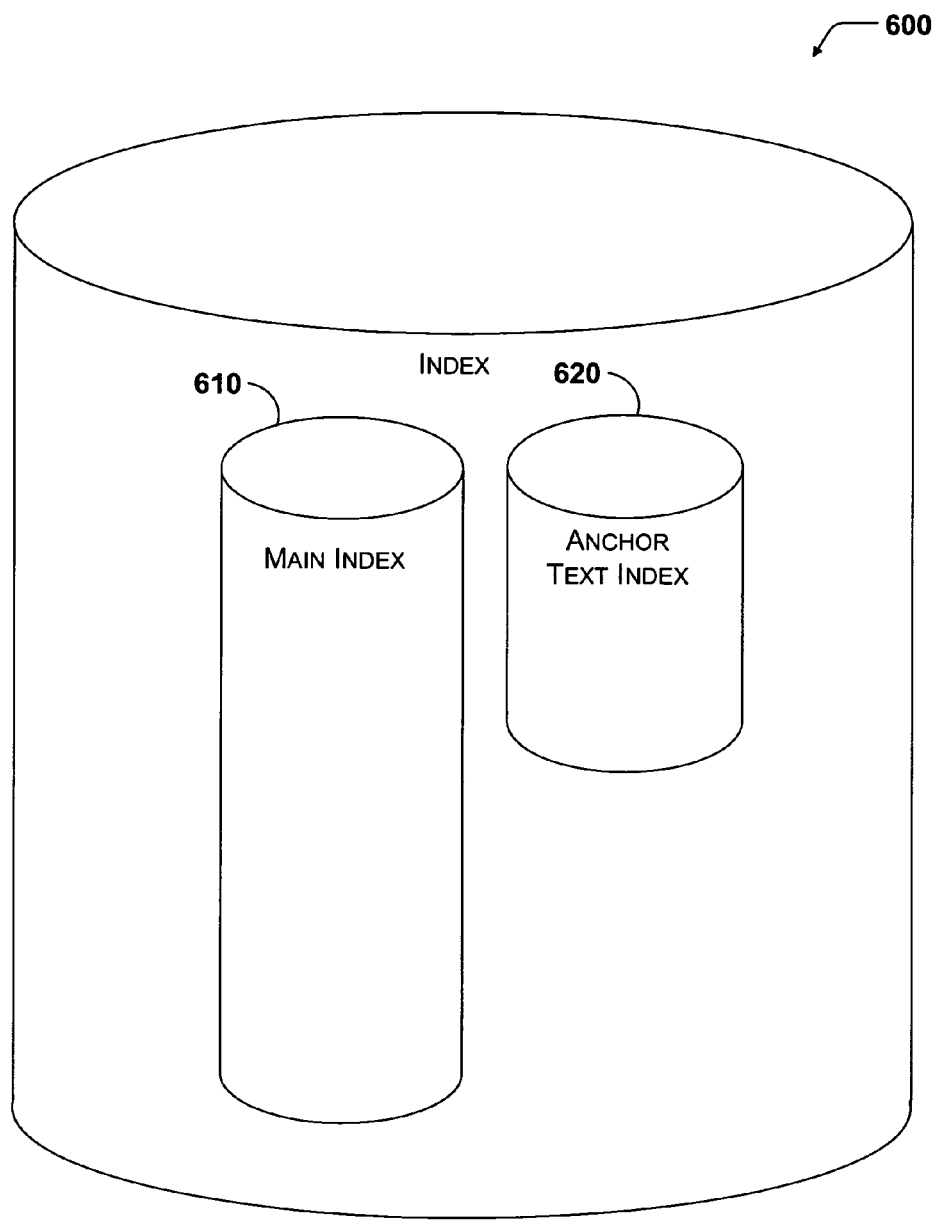
FIG. 6 illustrates a functional block diagram for an exemplary structure of an index.

FIG. 6 illustrates a functional block diagram for an exemplary structure of an index in accordance with the present invention. Index 600 includes main index 610 and anchor text index 620. In one embodiment, index 600 is considered "locally-stored" with respect to other data structures associated with the search engine query process. In this embodiment, the corpus of documents resides on the network, the data gathering modules, plugins (see FIG. 5), and plugin data structures reside on a server, and only index 600 resides in a local storage location. This make queries to index 600 much more efficient than queries to the corpus or other data structures.

Main index 610 includes records that correspond to the keywords and other index keys that are returned corresponding to the crawl of documents. Main index 610 also includes the other index partitions related to other properties of the documents. The records for that correspond to anchor text are diverted and entered into anchor text index 620.

Generally, anchor text index 620 includes records that correspond to the target documents of the anchor text included in documents on the network. These target documents are organized as an inverted index with the target document IDs listed in association with words included in the anchor text or URL associated with the target document. Anchor text index 620 is generated from the anchor text table after the crawl is complete. The anchor text corresponding to each target document is concatenated together in order to evaluate each target document for terms and enter the target document in anchor text index 620. Including a separate index partition for the anchor text allows relevance calculations to be made based on the anchor text before incorporating the anchor text as a factor in the scoring function of a document. Incorporating the anchor text into the scoring function for ranking documents is described more fully in the discussion of FIG. 6 below.

With the appended specialized words included in anchor text index 620 for the purposes of the fast click distance determination, the records of anchor text index 620 also include records corresponding to the specialized word. With the example anchor text table 570 shown in FIG. 5, the following records may be included in anchor text index 620:

word
    B, C, D, E, F, G
DocA
    B, C, D
DocB
    E, F
DocF
    G

This example shows how the target IDs are listed for the anchor text "word" that is used to link the source document with the target document, and the target IDs are also provided for the specialized words. This listing of the specialized words associates the source document with the target documents within anchor text index 620 itself. Since the association is established within anchor text index 620, the anchor text table does not need to be repeatedly accessed to determine the click distance of each document. Instead, a breadth first traversal may be performed on anchor text index 620 to determine the click distance faster. An exemplary process for determining the click distance for each document in the index is described in greater detail below with relation to FIG. 7. To place the increase in speed and efficiency of the embodiments described herein in perspective, in one example, a previous implementation of determining the click distance takes up to five hours to complete. With the current embodiments, the same determination took about thirty seconds. This dramatic increase in speed and efficiency allows the click distance to be a very useful factor in ranking results to search engine queries.

Figure 7:
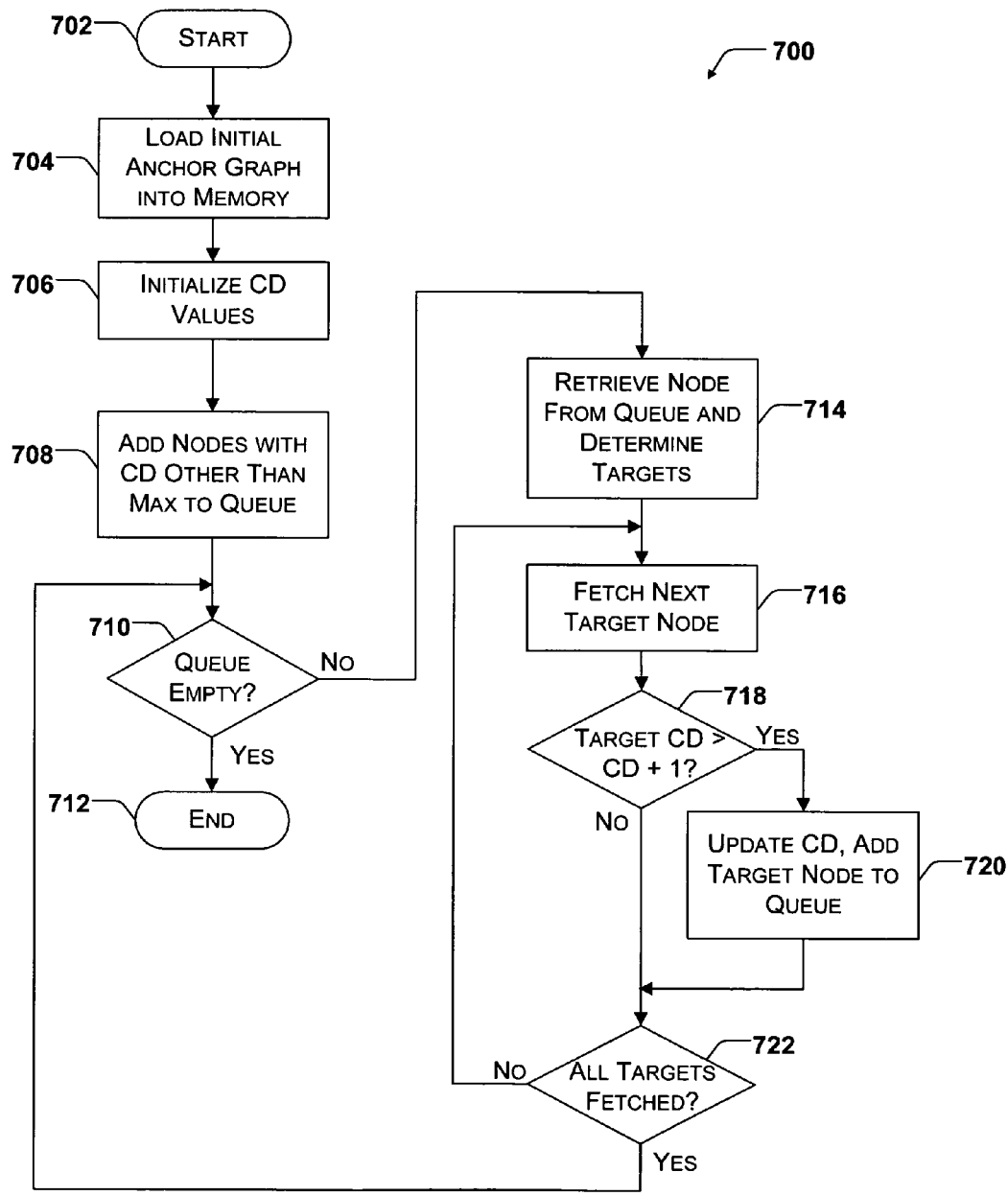
FIG. 7 illustrates a logical flow diagram of an exemplary process for determining the click distance, in accordance with the present invention.

FIG. 7 illustrates a logical flow diagram of an exemplary process for determining the click distance (CD) in accordance with the present invention. Process 700 starts at block 702 where documents on a distributed network have been indexed and generation of the anchor graph has been initiated. The process of generating the anchor graph is referred to as the anchor crawl. In one embodiment, the anchor crawl crawls the data gathered by a process where link and anchor text information is gathered and placed in an anchor text table as described in FIG. 5 above. Processing continues at block 704.

At block 704, the initial anchor graph is loaded into memory. A completed anchor graph corresponds to the structural representation of the document identification (e.g., document ID) and linking information gathered from the network. Examples of a network graph that may correspond to the anchor graph are shown in FIGS. 3 and 4. The anchor graph includes nodes that correspond to the documents of the network and edges that correspond to the anchors or links between the documents. Processing continues at block 706.

At block 706, click distance (CD) values for the parent nodes in the initialized anchor graph are also initialized. These parent or highest authority nodes are referred to as assigned nodes. These nodes are assigned a click distance value of 0 (zero). More than one high authority node may be designate for a single anchor graph. For example, an administrator may rank a set of one hundred nodes manually and designate them all as high authority nodes. Additionally, high authority nodes do not need to have a click distance of 0 (zero), any number may be assigned by an administrator. Changing the click distance of the high authority nodes does not alter the remaining algorithm, but simply provides a method for manually designating the importance of a node. For example, an administrator can improve the click distance score of some nodes. In other cases the administrator can decrease the click distance score (by forcing click distance to be higher than computed by the algorithm by default). The click distance for each of the unassigned nodes is initialized to a maximum value. In one embodiment, the maximum value essentially sets the click distance value to infinity. Assigning the infinity value to a node makes it easily recognizable as a node that has not had its click distance calculated. With the initializations of the click distance values for the assigned nodes complete, processing moves to block 708.

At block 708, the nodes that have an associated click distance other than the maximum value are inserted into a queue. In one example, this step only occurs in a first iteration. The nodes inserted into the queue correspond to the highest authority nodes since their click distance values are set to 0 (zero), a value other than the maximum value. Once the nodes with click distance value other than the maximum are added to the queue, processing continues at decision block 710.

At decision block 710, a determination is made whether the queue is empty. An empty queue signifies that no more nodes need the click distance of their target nodes calculated. If the queue is empty, processing moves to block 712 where process 700 ends. However, if the queue is not empty, processing continues at block 714.

At block 714, a node is retrieved from the queue and a determination of the set of nodes that are target nodes for the anchor is determined. The embodiments described herein allow this determination to be handled efficiently and fast. Instead of having to make iterative queries into the anchor text table, a simple query may be posed to the anchor text index. The anchor index resolves a certain type of query very efficiently. The type of query may be described as a query that asks "return all documents for which the associated anchor text contains wordX" where wordX represents a single word.

For the click distance determination, the same type of query is executed. However, in the click distance query to the anchor text index, the word referred to is a specialized word that has been appended to the anchor text. The specialized word corresponds to a source document for the anchor text. In the anchor text index, each specialized word includes a listing of the target documents associated with that specialized word. For example, referring to the example described above in the discussion of FIG. 6, a query that states "return all documents for which the associated anchor text contains DocA" returns the list of target IDs, B, C, and D, that represent the target documents of source document A. Again, utilizing the locally-stored anchor text index allows for a much more efficient determination of the click distance. Since the anchor text is stored locally, communication processes for communicating across a network are not necessary. Furthermore, the process is not iterative. Unlike dealing with the structure provided by the anchor text table, the query to the anchor text index is required only once to return all the target nodes (i.e., target documents) associated with the node retrieved from the queue. Once this node is retrieved and the target nodes are determined, processing moves to block 716.

At block 716, the next target node is fetched. The next target node refers the next document among the documents linked to by the originating document. Once the next target node is fetched, processing continues to decision block 718.

At decision block 718, a determination is made whether the click distance associated with the target node is greater than the click distance of the current page plus one (CD+1). In one embodiment, the only way the condition in block 718 is met is when the target node has a click distance of infinity (assuming that the high authority node is set to zero and an administrator has not manually set a click distance). For example, if the current click distance is 1, then CD+1=2. A click distance of 2 is less than infinity and the condition is met. Determining whether the target click distance is greater than the click distance plus one prevents target documents with a lower click distance from being changed. Using the previous example, if the click distance of the target node is 1, and the current click distance is also 1, then the target click distance is not greater than CD+1=2. In this instance, the shorter path to the target node has already been recorded and therefore need not be updated. Accordingly, when the target click distance is not greater than the current click distance plus one, processing advances to decision block 722. However, if the target click distance is greater than the current click distance plus one, processing moves to block 720.

At block 720, the click distance value of the target node is updated and the target node is added to the queue as a node where click distance calculation of its targets needs to be done. The target node is updated with a new click distance value to remove the infinity value and set the nodes calculated click distance value. In one embodiment, the click distance value of the node is set to the current click distance value plus one (CD+1). Processing continues at decision block 722.

At decision block 722, a determination is made whether all the target nodes have been fetched for the current node retrieved from the queue. If there are target nodes left to fetch for the current node, processing returns to block 716 where the next target node is fetched. However, if all the target nodes corresponding to the current node have been fetched, processing returns to decision block 710 to recheck if the queue is now empty. Again, once the queue is empty, processing moves to block 712, where process 700 ends.

It is appreciated that the operational blocks described in process 700 may be repeated as necessary to assign each document on a network a click distance value. It is possible that not all of the nodes in a network are connected to the initial high authority nodes through any other node. Accordingly, in another embodiment of the present invention, the nodes that are not connected in any way to the high authority nodes are assumed to have a low importance and are assigned a click distance that is less than average for the anchor graph.

With the click distance of each document determined according to the fast determination process described herein, the click distance may then be used as desired in any scoring or ranking function for refining the ranked results of documents on the network in response to a query. When the scoring function is executed and the relevance score for the document is calculated, the score now reflects, in part, the click distance value for the document.

Although the invention has been described in language that is specific to structural features and/or methodological steps, it is to be understood that the invention defined in the appended claims is not necessarily limited to the specific features or steps described. Rather, the specific features and steps are disclosed as forms of implementing the claimed invention. Since many embodiments of the invention can be made without departing from the spirit and scope of the invention, the invention resides in the claims hereinafter appended.

What is claimed is:

1. A computer-implemented method for determining a click distance associated with documents on a network, comprising:
    storing document and link information for the documents;
    within the document and link information, additionally storing a specialized word in association with a target document, wherein the specialized word is a variation of a document identifier for a source document that provides a unique word that associates the target document with the source document; wherein the specialized word is appended to anchor text that is associated with the target document;
    including the specialized word and any target identifiers for the specialized word in an inverted index, wherein the locally stored inverted index relates the specialized word with an identifier of the target document; and
    assigning a click distance to the source document when an inverted index is queried for the target document according to a query that passes in the specialized word.

2. The computer-implemented method of claim 1, wherein the inverted index corresponds to an anchor text index that is arranged to store a listing of words contained in the anchor text and documents identified as associated with each word.

3. The computer-implemented method of claim 1, wherein storing the document and link information further comprises storing anchor text included in the source document, wherein the anchor text is stored such that the anchor text is associated with the target document.

4. The computer-implemented method of claim 3, further comprising storing the document and link information including the anchor text in an anchor text table.

5. The computer-implemented method of claim 4, wherein the click distance of one of the target nodes is set to the click distance of the current node plus a variable when the click distance of the one of the target nodes is greater than the click distance of the current node plus the variable.

6. The computer-implemented method of claim 1, wherein storing the specialized word further comprises appending the specialized word to anchor text stored within an anchor text table.

7. The computer-implemented method of claim 6, further comprising constructing an anchor graph that includes the documents of the network as nodes and further includes records of the anchor text table as links of the anchor graph.

8. The computer-implemented method of claim 1, wherein including the specialized word in the inverted index further comprises inserting the specialized word into the inverted index when anchor text to which the specialized word is appended is also inserted into the inverted index.

9. The computer-implemented method of claim 1, wherein assigning a click distance to the source document further comprises assigning an initial click distance value to the source document when the source document corresponds to a high authority node within an anchor graph.

10. The computer-implemented method of claim 9, wherein more than one high authority node is designated for the anchor graph.

11. The computer-implemented method of claim 9, further comprising assigning an initial infinity value as the click distance value when the source document corresponds to a node other than a high authority node.

12. The computer-implemented method of claim 11, further comprising inserting the source document into a queue when the source node has a click distance value other than the initial infinity value.

13. The computer-implemented method of claim 11, further comprising retrieving the source document from the queue to query the inverted index.

14. A computer-readable storage medium having stored thereon instructions that when executed implements the computer-implemented method of claim 1.

15. A system, comprising:
    a processor;
    a document interface that is arranged to provide access to documents stored on a network;
    an anchor text table that is arranged to store document and link information corresponding to the documents on the network, wherein the anchor text table includes records of target documents and their associated anchor text;
    specialized words that are appended to the anchor text associated with each target document, wherein each of the specialized words is a variation of a document identifier for a source document that provides a unique word that associates a source document with one or more of the target documents;
    an inverted index that is arranged to list words included in anchor text and the target documents associated with each word, such that the specialized words are also listed in the inverted index with target identifiers for each of the target documents associated with each specialized word; and
    a client interface that is arranged to implement a search engine, wherein the search engine determines a click distance associated with each document stored on the network by incrementing a click distance value associated with each document stored on the network when a query to the inverted index for the target documents correspond to the document stored on the network is made.

16. The system of claim 15, wherein the inverted index corresponds to an anchor text index that is arranged to store a listing of words contained in the anchor text and documents identified as associated with each word.

17. The system of claim 15, wherein the inverted index is locally-stored in comparison to the documents on the network.

18. The system of claim 15, wherein the inverted index corresponds to a partitioned index, wherein a first partition corresponds to a main index, and a second partition corresponds to an anchor text index.

19. A computer-readable storage medium having stored thereon instructions that when executed implements the system of claim 15.

20. A computer-readable storage medium that includes computer-executable instructions for determining click distance, the instructions comprising:

storing document and link information for documents on a network such that a network graph representing the network is initiated in memory;

storing each document represented in the network graph in a queue when the document has a click distance value that is different from a first click distance value; and when the queue is not empty:

retrieving a document from the queue, determining target documents associated with the retrieved document by querying an anchor index, wherein the anchor index includes appended specialized words that are a variation of document identifiers for source documents that provide unique words that associate the target documents with source documents and any target identifiers for the specialized word;

assigning a click distance for each of the target documents associated with the retrieved document, wherein each target document is updated with a new click distance value other than the first click distance value when each target document's click distance is greater than the click distance associated with the removed document plus a variable, and adding each of the target documents to the queue that have been updated.

\* \* \* \* \*